United States Patent [19]

Takada

[11] 4,063,777
[45] Dec. 20, 1977

[54] SHOULDER SAFETY BELT RETRACTOR

[75] Inventor: Juichiro Takada, Tokyo, Japan

[73] Assignee: Takata Kojyo Co., Ltd., Tokyo, Japan

[21] Appl. No.: 677,639

[22] Filed: Apr. 16, 1976

[30] Foreign Application Priority Data

Apr. 19, 1975 Japan .............................. 50-046978

[51] Int. Cl.² .............................................. A62B 35/00
[52] U.S. Cl. ............................... 297/388; 200/61.58 B
[58] Field of Search ....................... 297/388, 389, 385; 280/150.5 B; 200/61.58 B; 340/278; 244/122 R, 122 B; 242/107.4

[56] References Cited

U.S. PATENT DOCUMENTS

| | | | |
|---|---|---|---|
| 3,632,059 | 1/1972 | Loose | 200/61.58 B |
| 3,740,567 | 6/1973 | Atkins | 340/278 X |
| 3,787,804 | 1/1974 | MacDonald | 340/278 X |
| 3,890,003 | 6/1975 | Close | 297/388 |
| 3,913,860 | 10/1975 | Takada | 200/61.58 B |
| 3,926,385 | 12/1975 | Board | 297/388 |
| 3,930,682 | 1/1976 | Booth | 297/388 |

Primary Examiner—James T. McCall
Attorney, Agent, or Firm—Wolder & Gross

[57] ABSTRACT

A vehicle shoulder safety belt retractor includes a first ratchet wheel carrying reel which is biased in a belt retraction direction and an oppositely oriented second ratchet wheel is mounted on the first ratchet wheel. A first normally retracted pawl is associated with the first ratchet wheel and a mechanism responsive to either highly accelerated belt withdrawal or the excessive acceleration or tilting of the vehicle or both for advancing the first pawl to lock the reel against belt extraction in emergencies. A second pawl is advanced by energization of an actuating solenoid to engage the second ratchet wheel and brake the reel against belt retraction. The solenoid is connected to a source of current through a series connected pair of switches, one of which is closed with the application of the seat belt and the other being located in the seat back and which is closed by the seat occupant reclining against the seat back so that the shoulder belt pressure against the comfortably seated occupant is obviated.

9 Claims, 6 Drawing Figures

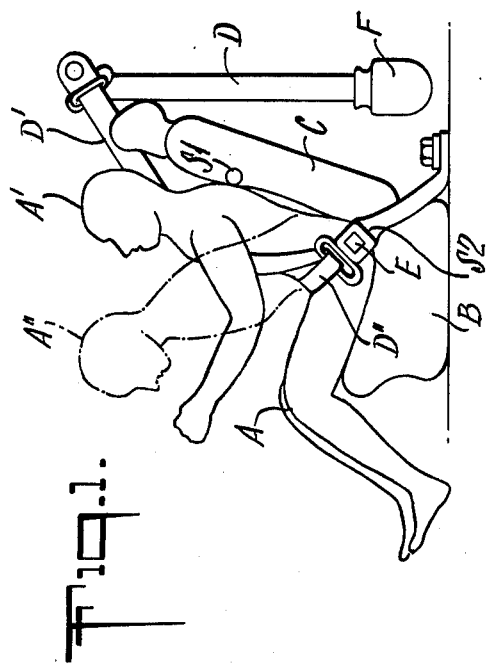
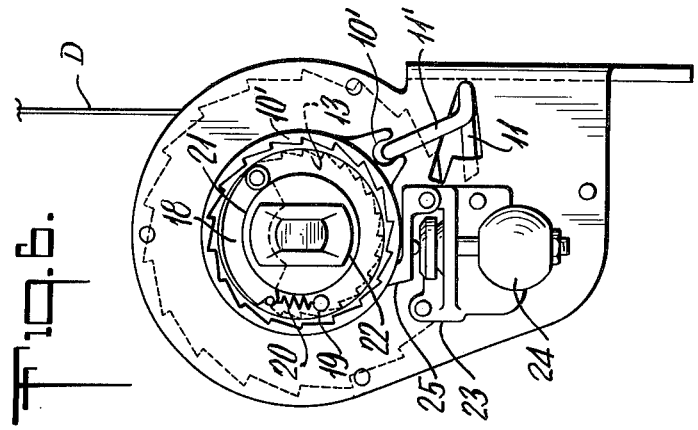
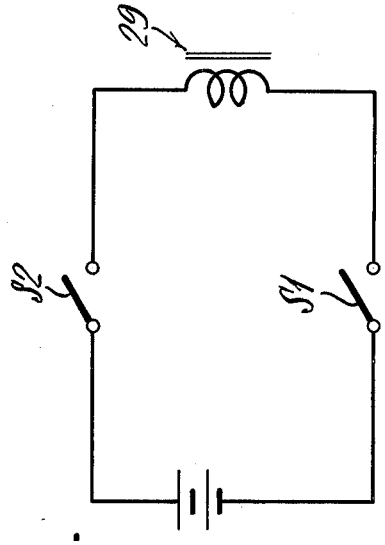
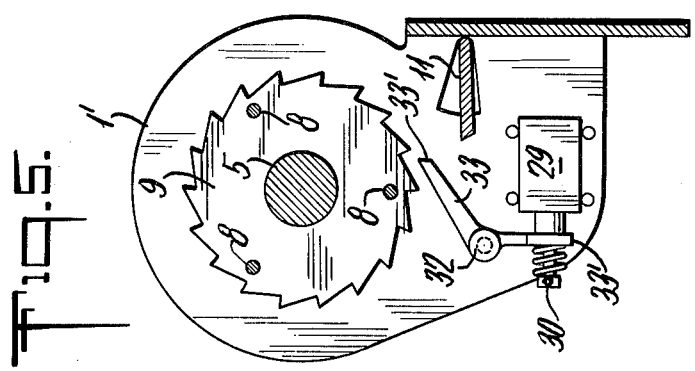
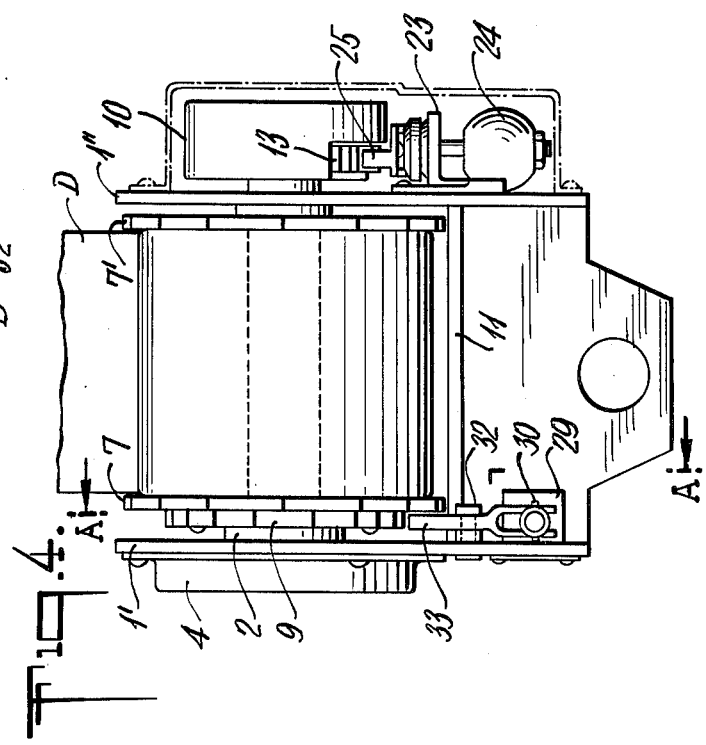

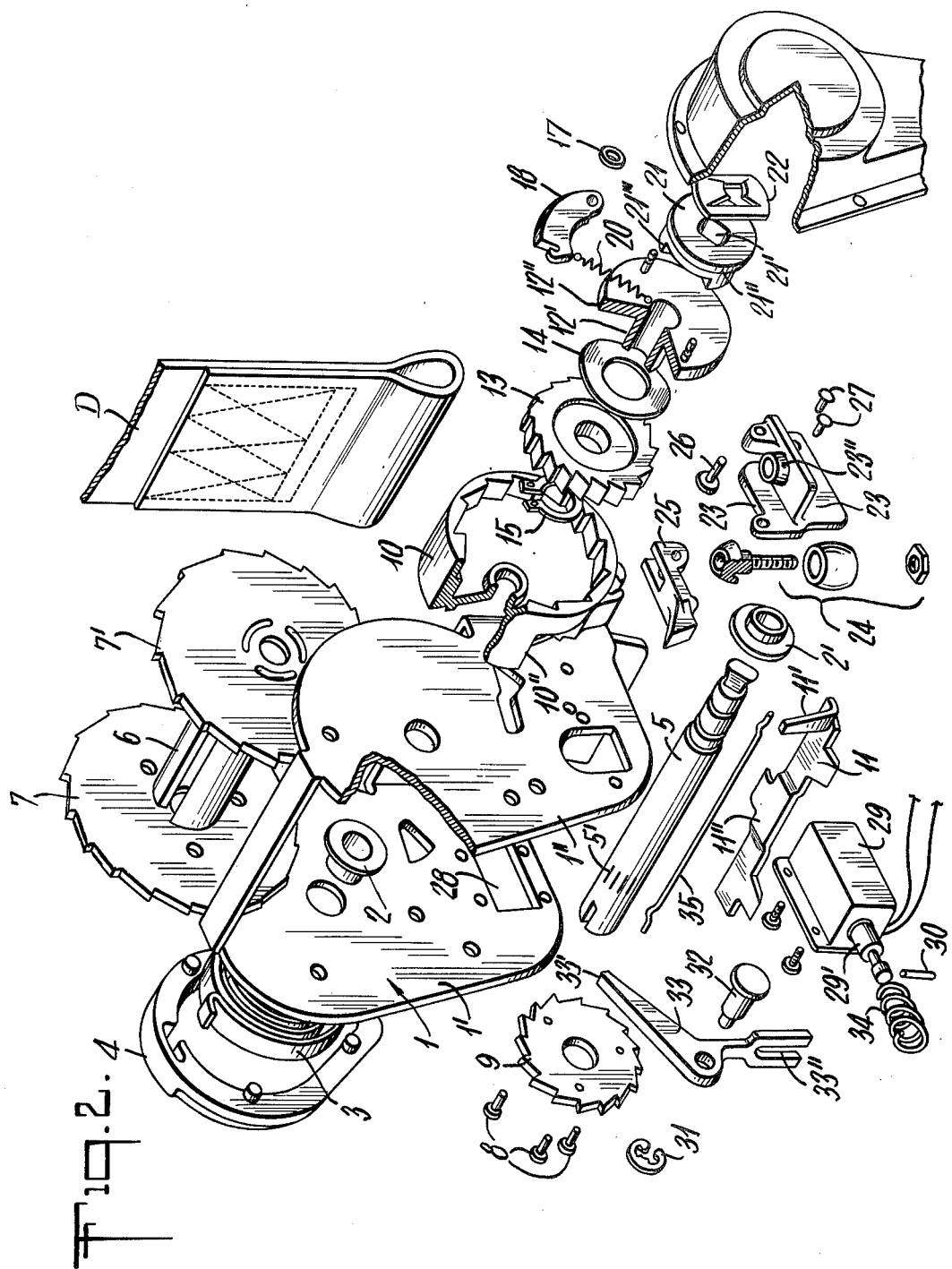

SHOULDER SAFETY BELT RETRACTOR

BACKGROUND OF THE INVENTION

The present invention relates generally to improvements in vehicle safety belt systems and it relates more particularly to an improved automatic locking retraction reel which responds to emergency conditions and the position of the seat occupant.

The occupant of a vehicle seat, whether it is the driver or a passenger, who is under the restraint of an applied safety belt, particularly a shoulder or three point safety belt, should not only be unrestricted in his movement, except under emergency or collision conditions, but should not have undue pressure applied to him when he assumes his normal optimum or comfortable seated position. The safety belt systems heretofore proposed or available do not meet the above criteria and possess numerous drawbacks and disadvantages. While the conventional collision responsive automatic locking reel does not unduly restrain the forward movement of the seat occupant during normal condition the seat occupant is continuously under the high oppressive stress of the shoulder belt which is continuously strongly pulled in a belt retraction direction to the great discomfort and inconvenience of the seat occupant. Thus, the conventional automatic locking safety belt retraction reel leaves much to be desired.

SUMMARY OF THE INVENTION

It is a principal object of the present invention to provide an improved vehicle safety belt system.

Another object of the present invention is to provide an improved vehicle safety belt retractor and control mechanism.

Still another object of the present invention is to provide an improved emergency locking safety belt retraction mechanism.

A further object of the present invention is to provide a system and mechanism of the above nature characterized by their reliability, ruggedness, ease and convenience of use and high versatility and adaptability.

The above and other objects of the present invention will become apparent from a reading of the following description taken in conjunction with the accompanying drawings which illustrate preferred embodiments thereof.

In a sense the present invention contemplates the provision of an improved safety belt system associated with a vehicle seat occupant, the system comprising a belt retractor reel having a safety belt connected thereto and being rotatable in opposite belt extraction and retraction directions and being spring biased to rotate in a belt retraction direction, a first ratchet rotatable with the reel, a first pawl movable between advanced and retracted positions engaging and disengaging the first ratchet wheel respectively, the ratchet wheel and pawl being so oriented and related that when the pawl engages the ratchet wheel the reel is braked against rotation in a belt retraction direction and control means responsive to a predetermined position of the seat occupant for advancing the pawl into engagement with the ratchet reel.

In the preferred form of the improved safety belt system, the reel is provided with second ratchet wheels rotatable with the reel and oppositely oriented and connected to the first ratchet wheel and second pawls are advanced and retracted into and out of engagement with the second ratchet wheels to respectively lock the reel against belt extraction rotation and release the reel. The second pawls are advanced by a mechanism which responds to a rapid or high acceleration belt extraction or to the vehicle exceeding a predetermined acceleration or tilt angle. The first pawl is spring retracted and actuated to advance by the energization of a solenoid which is connected to a source of current through series connected normally open first and second switches. The first switch is closed with the coupling of the belt buckle or the extraction of a predetermined length of belt and the second switch is located in the seat back and closed when the seat occupant reclines against the seat back.

The improved vehicle safety belt system is easy and convenient to apply and does not unduly interfere with the normal movements of the seat occupant or apply oppressive stresses to the occupant under normal conditions.

BRIEF DESCRIPTION OF THE DRAWINGS

FIG. 1 is a side elevational view of the improved safety belt system illustrated as applied to a vehicle seat occupant;

FIG. 2 is an exploded partially fragmented perspective view of a reel employed in the system of FIG. 1 and embodying the present invention;

FIG. 3 is a schematic diagram of the control network of the system;

FIG. 4 is a front elevational view of the invention;

FIG. 5 is a sectional view taken along line 5—5 of FIG. 4; and

FIG. 6 is a side elevational view of FIG. 4 partly in phantom.

DESCRIPTION OF THE PREFERRED EMBODIMENT

Referring now to the drawings which illustrate a preferred embodiment of the present invention, the reference letter A, generally designates a seat occupant or passenger who under normal driving conditions assumes a comfortable position A' with his torso slightly rearwardly inclined and bearing against the seat back C as shown by solid line in FIG. 1. However, in the event of a head-on collision or immediately following a rear end collision, the seat occupant A is impelled forward to a slouching position A" as shown by broken line, or at least his torso is thrust a considerable distance forwardly of the seat back C.

Accordingly, in the embodiment of this invention shown in FIG. 1, as the most simple and reliable method, a pressure responsive position detection switch S1 is provided in a shoulder portion of the seat back C, but there may be employed other types of switches such as a straight radiation beam switch for example, an infrared-ray or other beam switch or tape type switch which can detect the position of the passenger, even if he is slightly spaced from the seat back C, and still in a comfortable or easy position. It will be apparent that such position detection switch may be used in any method or at any position if it is able to detect the desired comfortable position of the passenger. A wear detection switch S2 designed to detect the harnessing of the seat belt D is provided in the buckle E. As such a detection switch is contained in the buckle assembly, just the reference sign S2 alone is given in the drawing. Such switch may be a generally conventional switch arranged to be actuated upon joining a buckle E with a tongue in the known manner. Alternatively, the switch S2 may be contained in the retracting device F so as to detect the length of the belt D drawn out, or any other position or method may be used to detect proper wearing of the seat belt D. The belt D is preferably a three-point type continuous waist-shoulder belt unit equipped with a retractor device as shown in FIG. 1, but this invention can be also effectively applied to a multiple section waist and shoulder belt type seat belt assembly equipped with two winding devices. In the retracting device F employed in the seat belt assembly of the present invention, there is advantageously included a lock or brake mechanism designed to inhibit the draw-out or extraction of the belt D in the event of an emergency, and such mechanism may be of a type operable responding to the acceleration of the vehicle or rapid extraction or draw-out of the belt D or a type employing both such responses. There is also employed a belt winding inhibition mechanism such as hereinafter described.

The improved winding device of this embodiment consists of the following mechanisms. The improved belt retracting mechanism comprises a U-shaped frame 1 which can be secured at its base to the vehicle body wall or other vehicle part with a desired orientation and axially aligned bearings 2, 2′ formed of a low friction resin to engage corresponding transversely aligned holes formed in both side plates 1′, 1″ of the frame 1. A spiral return spring 3 of conventional construction is housed in a spring cover 4 housing on side plate 1 and a shaft 5 is journalled in bearings 2, 2′ and has at its one end a spring engaging portion and at its other end a stepped portion and also has a polygonal portion 5′ shaped to be press-fit in the ratchet wheels to be hereinafter described. In assembling the parts, first the spring cover 4 is fixed on a jig, then the return spring 3, shaft 5 and bearings 2, 2′ are press-fit and finally the frame 1 mounted with the members of the herebelow described belt clamping mechanism is set in position. The belt clamping mechanism comprises a drum 6 through a slit in which the end portion of the belt D which is looped is inserted and is held in the drum by shaft 5 extending through a pair of ratchet wheels 7, 7′ to which both ends of said drum 6 are secured by means of arcuate slots formed in said respective wheels. A reverse directed toothed ratchet wheel 9 is secured to one of the ratchet wheels 7, 7′ or to the drum 6 by means of rivets 8 or arcuate slot fittings. Ratchet wheel 9 is provided with teeth oriented in an opposite direction to those of the ratchet wheels 7, 7′ but there may be substituted therefor a circular friction wheel.

The lock mechanism comprises a ratchet wheel 10 which has internally formed teeth having the same number as ratchet wheels 7, 7′ and also has a pawl operating groove 10′ and a pawl slot 10″ at its periphery, said wheel 10 being disposed outside of the frame side plate 1″ and loosely mounted on the stepped portion of the shaft 5. A pawl unit 11 has pawl portions engageable with respective ratchet wheels 7, 7′ and also has an operating bar or finger 11′ interlocked with said wheel 10 and in addition has at its center a projecting flat portion 11″ designed to prevent over retracting of the belt D. A wire spring 35 normally urges pawl unit 11 into engagement with the ratchet wheels 7, 7′. The pawl unit 11 extends between side plates 1′, 1″ of the frame 1, with the operating bar 11′ being engaged in the groove 10′ so that the ratchet wheels 7, 7′ are pawl engaged synchronously with movement of the wheel 10.

The locking motion transmitting mechanism comprises an integral shaft and disc assembly 12 loosely mounted on the shaft 5 at the inside of the wheel 10 and having a coaxial hollow shaft portion 12′ and a disc or inertia wheel portion 12″. A multiple-toothed wheel 13 is loosely fitted on the shaft portion 12′ and another clutch spring 14 is interposed between the disc portion 12″ of member 12 and the multiple-toothed or ratchet wheel 13 and a snap ring 15 secures the multiple-toothed wheel 13 in position. A pawl and follower 18 is loosely fit on a pivot pin 16 provided on the outside face of the disc portion 12″ and retained thereon by a washer 17. A pawl tension spring 20 extends between pawl 18 and another pin 19 on disc 12″ and normally pulls pawl 18 inwardly. A cam assembly comprises a cam wheel 21 provided with an oblong bore 21′ press-fit on the end of the shaft 5 and having a flanged portion 21″ and a cam portion 21‴ shaped and positioned to ensure accurate sliding engagement by said pawl follower 18. A pressure plate 22 having a double safety function engages the end of the shaft 5 to prevent dislocation or removal of the cam wheel 21 and also presses cam wheel 21, members of said transmitting mechanism and said wheel 10 against the frame side plate with a constant pressure even if the cam wheel 21 should become loose after extended use.

An acceleration and inclination sensing pendulum assembly comprises a pendulum support 23 having at its back or inside face a square inward protuberance 23′ of the same size as and engaging a square opening formed in one of the frame side plates 1′ and also having on its upper side an inverted conical or cylindrical tube-shaped pendulum socket 23″ and a pawl pivot pin bore 23‴. A pendulum 24 has an umbrella-shaped fulcrum portion formed of resin and resting on socket 23″ and includes a weight made of lead or the like mounted on a threaded and stepped stem arm of the pendulum and micro-adjusted for sensitivity by a nut and welding the end of said stepped stem arm. A pawl 25 is engageable with the multiple-toothed or ratchet wheel 13 through the pawl slot 10″ formed in wheel 10 and a pawl pivot pin 26 engaging bore 23‴ and knuckles in pawl 25 swingably connects pawl 25 to the pendulum support 23 which is secured to plate 1″ by small screws 27. All of these members are assembled integrally and mounted to the frame side plate 1″.

The winding preventing mechanism comprises a solenoid opening 28 provided on the frame side plate 1″, a solenoid 29 having a solenoid core 29′ provided with one step stage along the axis and provided with a taper pin 30 at its end. A stepped headed pin 32 engaged by a locking E-ring 31 is located at a suitable position of the frame side wall 1′ and swingably supports a check lever or pawl 33 having an engaging portion 33′ engageable with the reverse-toothed wheel 9 and a U-shaped or yoke portion 33″ loosely fitted on the stepped portion of solenoid core 29′. A compression spring 34 is disposed around the solenoid core 29′ and between the solenoid body and the U-shaped portion 33″ of the check lever 33. The engaging portion 33′ of the check lever 33 is engaged with the reverse-toothed wheel 9 during the time when the solenoid 29 is energized. However, as a friction disc may be used instead of the reverse-toothed wheel 9 as said before, the above-described shape and function of the check lever 33 and engaging portion 33′ may be correspondingly modified. Also, the compression spring 34 may be replaced by a pull spring depending on whether the solenoid is energized or deenergized according to the position of installation.

Considering now the operation of the seat belt device described above with the solenoid control network shown in FIG. 3 and wherein there is employed a mechanism where the check lever 33 is engaged with the reverse-toothed wheel 9 in case of the solenoid 29 is energized the wiring diagram of FIG. 3 represents the situation where the passenger A is not yet seated. When the passenger A is seated and wears the seat belt D, the wear detection switch S2 is closed, but under this condition, the normal emergency lock mechanism alone is operable but normally unactuated so the belt D can be either extracted or retracted. Then when the passenger A assumes the easy or comfortable position A', the position detection switch S1 is also closed to energize the solenoid 29 to inhibit any further reel-up of the belt D. In the event of emergency, the lock mechanism operates at any time regardless of the position of the passenger A to protect him, and when he takes a slouching position A", there is restored the condition where the essential emergency locking mechanism alone can operate.

Now considering the operation of the specific retracting device illustrated in FIG. 2, in the case of emergency locking action by the belt D being extracted quickly, the locking action transmitting member group combined with the shaft disc assembly 12 rotates slower than the cam wheel 21 secured on the shaft 5 which slower or lagging movement causes the cam portion 21''' to push the pawl 18 outward relative the axis of shaft 5. As a result of pawl 18 being pushed outwardly, it acts to revolve therewith the wheel 10 which actuates the pawl 11 to engage ratchet wheel 7, 7' to brake the reel and stop the extraction of the belt D. In case an excess accelerating or decelerating speed is applied to the vehicle or in case the vehicle body is inclined beyond a predetermined angle, the pendulum 24 is tilted relative to the pendulum support 23 and the top of the pendulum 24 pushes up the pawl 25 to engage an inhibit movement of the multiple-toothed or ratchet wheel 13 which latter also inhibits rotation of the shaft-disc assembly 12 within the range of a certain anti-rotation force provided by the clutch spring 14. However, the cam wheel 21 secured to the shaft 5 continues to rotate as the belt is further extracted so the rotation of cam 21 allowing the cam portion 21''' to push the pawl 18 toward outside of the axial center. Therefore, the rotating advanced pawl 18 rotates the wheel 10 to cause the pawl 11 to engage the ratchet wheels 7, 7' to inhibit extraction of the belt D.

Retraction of the belt is inhibited in the following way when the solenoid 29 is energized. That is, when the solenoid 29 is energized, the U-shaped portion 33'' of the check lever 33 loosely fitted on the solenoid core 29' together with the compression spring 34 is attracted by the solenoid core 29' in the direction of the solenoid 29, which attraction makes the check lever 33 swing about the stepped pin 32 to cause its engaging portion 33' to engage with the reverse-toothed wheel 9. The reverse-toothed wheel 9 is arranged integrally with the drum 6, and thus, the brake unit prevents the belt retraction by the force supplied by the return spring 3. In such a retraction prevented condition, the belt should be withdrawn out by a hand of the passenger or by movement of his body, the reverse-toothed wheel 9 turns counterclockwise in FIG. 2 to let the check lever 33 press the compression spring 34 to allow some extraction of a required length of the belt D.

While there have been described and illustrated preferred embodiments of the present invention, it is apparent that numerous alterations, omissions, and additions may be made without departing from the spirit thereof.

I claim:

1. Seat belt assembly for vehicles equipped with an emergency locking type belt retracting device characterized in that said seat belt assembly comprises a normal position detection switch which is actuated when the passenger assumes a predetermined position on the seat as when reclining comfortably against the seat, said switch being provided in the seat back or other suitable location, a belt wear detection switch designed to be actuated when the passenger puts on the belt, said switch being provided in the buckle or other suitable position, a lock mechanism adapted to inhibit draw-out of the belt in the event of emergency, said lock mechanism being provided in the winding device, a reversely toothed wheel which is toothed reversely to the ratchet wheels of said lock mechanism, said reversely toothed wheel being secured on said ratchet wheel and the like, and a solenoid provided in a frame or other member and adapted to have a check lever fitted in said frame engaged with said wheel, said solenoid being electrically connected to said both switches whereby only when the passenger both takes the predetermined position and wears the belt, is said solenoid energized or deenergized to stop the retraction of the belt by the action of said check lever, and means including a reversely toothed wheel and other members for allowing draw-out of the belt, and in the event of trouble such as a crash, the belt is emergency locked regardless of the position of the passenger.

2. The seat belt assembly of claim 1 equipped with an emergency locking type belt retracting device characterized in that said emergency locking retracting device comprises a mechanism operable responding to acceleration of the vehicle or to draw-out of the belt or to a mechanism adopting both of said above actional factors is employed as well-known emergency lock mechanisms, and a rotation inhibiting means such as reversly toothed wheel or a friction disc is secured to a rotative member such as shaft on which the belt is reeled up, and also a checking member such as a check lever adapted for preventing said rotation inhibitor means provided in a frame or other suitable position, said checking member being actuated by the solenoid responding to any of the checking positions and the releasing positions, said solenoid being secured to said frame.

3. The seat belt assembly of claim 1 equipped with an emergency locking type belt retracting device characterized in that said retractor comprises a customary winding mechanism including a return spring provided outside of one of the side plates of the U-shaped frame and combined with the frame having bearings together with a spring cover and a shaft so that the mechanism can be easily press-fitted in the present position, a belt fastening mechanism including a drum, ratchet wheels and reversely toothed wheel mounted unitedly together in the inside of the frame, a locking mechanism including a pawl engaged with said ratchet wheels synchronously with a wheel provided outside of another side plate of the frame and having internally the same number teeth as said ratchet wheels, a motion transmitting mechanism including a wheel having coaxially mounted with a clutch spring and a multiple-toothed wheel and also integrally combined with a pawl, a cam assembly mounted on the shaft and including a cam portion adapted to press the pawl outwardly of the axial center corresponding to the rotational difference between the belt draw-out force and rotative force of said transmitting mechanism, a pendulum assembly including a pendulum support, a sensor pawl fitted in a square hole in another frame side plate and a pendulum, both pawl and pendulum being arranged to have a common fulcrum so as to improve sensing accuracy, and a retraction inhibiting mechanism including a solenoid secured to one side plate of said frame or other suitable place and a check lever loosely fitted to said side plate or other part and adapted to prevent rotation of said reversely toothed wheel, wherein the two kinds of lock mechanisms designed for improving accuracy of operation and facilitating assemblage and the belt retracting inhibitor mechanism are assembled in three kinds of novelty combining unit.

4. In association with a vehicle seat, a safety belt system comprising a belt retractor reel having a safety belt connected thereto and being rotatable in opposite belt extraction and retraction directions and being spring biased to rotate in a belt retraction direction, a first ratchet wheel rotatable with said reel, a first pawl movable between advanced and retracted positions engaging and disengaging said first ratchet wheel respectively and being normally resiliently biased out of engagement with said first ratchet wheel, a solenoid coupled to said first pawl to advance said pawl with the energization of said solenoid, a first switch actuated in response to the torso of an occupant of said seat being disposed rearwardly of a predetermined position relative to the back of said seat, a second switch actuated in response to the application of said belt to said seat occupant and means responsive to the actuation of both said first and second switches for energizing said solenoid.

5. The system of claim 4 wherein said first and second switches are normally open and closed in their actuated positions and said solenoid energizing means comprises means connecting said solenoid and said first and second switches in series to a source of current.

6. The system of claim 4 including a second ratchet wheel rotatable with said reel and oriented in a direction opposite to that of said first ratchet wheel, a second pawl movable to advanced and retracted positions in and out of engagement respectively with said second ratchet wheel and resiliently retracted to a ratchet disengage position and actuating means responsive to sharp extraction rotation of said reel for urging second pawl into engagement with said second ratchet wheel to prevent further belt extraction rotation of said reel.

7. The system of claim 6 including a shaft supporting and rotatable with said reel, said second pawl actuating means comprising a third ratchet wheel freely rockably supported by said shaft for movement between advanced and retracted positions, means coupling said third ratchet wheel to said second pawl for advance of said second pawl with advance of said third ratchet wheel, an inertia wheel mounted on and rotatable relative to said shaft, a third pawl mounted on said inertia wheel for advance and retracted movement into and out of engagement with said third ratchet wheel and spring biased to a retracted position and including a follower portion and a cam affixed to and rotatable with said shaft and engaging said follower to advance said third pawl when said fly wheel lags the rotation of said cam.

8. The system of claim 7 including a fourth ratchet wheel slip drive coupled to said inertia wheel and oriented in an opposite direction to that of said first ratchet wheel, a fourth pawl movable to advanced and retracted positions engaging and disengaging said fourth ratchet wheel, said fourth pawl being normally retracted and when advanced preventing the belt extraction rotation of said reel and fourth ratchet wheel and actuating means responsive to a predetermined acceleration of the vehicle for advancing said fourth pawl and braking said reel against belt extraction.

9. The system of claim 8 wherein said fourth pawl actuating means comprises a pendulum and means responsive to the swinging of said pendulum a predetermined angle for moving said fourth pawl to its advance position.

* * * * *